United States Patent
Han

(10) Patent No.: US 10,858,508 B2
(45) Date of Patent: Dec. 8, 2020

(54) POLYOLEFIN BLEND WITH UNIQUE MICROPHASE STRUCTURE

(71) Applicant: Union Carbide Corporation, Midland, MI (US)

(72) Inventor: Suh Joon Han, Schwenksville, PA (US)

(73) Assignee: Union Carbide Corporation, Seadrift, TX (US)

( * ) Notice: Subject to any disclaimer, the term of this patent is extended or adjusted under 35 U.S.C. 154(b) by 0 days.

(21) Appl. No.: 16/607,553

(22) PCT Filed: Apr. 20, 2018

(86) PCT No.: PCT/US2018/028469
§ 371 (c)(1),
(2) Date: Oct. 23, 2019

(87) PCT Pub. No.: WO2018/200318
PCT Pub. Date: Nov. 1, 2018

(65) Prior Publication Data
US 2020/0095411 A1    Mar. 26, 2020

Related U.S. Application Data

(60) Provisional application No. 62/490,263, filed on Apr. 26, 2017.

(51) Int. Cl.
*H01B 7/00* (2006.01)
*C08L 23/14* (2006.01)
*H01B 3/30* (2006.01)
*H01B 3/44* (2006.01)

(52) U.S. Cl.
CPC ........... *C08L 23/142* (2013.01); *H01B 3/307* (2013.01); *H01B 3/441* (2013.01); *C08L 2203/202* (2013.01); *C08L 2205/025* (2013.01); *C08L 2207/02* (2013.01); *C08L 2312/00* (2013.01)

(58) Field of Classification Search
CPC ... H01B 3/02; H01B 3/04; H01B 3/44; H01B 3/307; H01B 3/401; C08L 23/142; C08L 23/08; C08L 2203/202
USPC ............... 174/110 R–110 N, 120 R–122 SR
See application file for complete search history.

(56) References Cited

U.S. PATENT DOCUMENTS

| | | | |
|---|---|---|---|
| 4,018,852 A | 4/1977 | Schober | |
| 4,935,467 A * | 6/1990 | Cheng | C08L 23/08 252/511 |
| 5,212,218 A | 5/1993 | Rinehart | |
| 5,246,783 A | 9/1993 | Spenadel et al. | |
| 5,346,961 A | 9/1994 | Shaw et al. | |
| 5,571,864 A * | 11/1996 | Bates | C08C 19/02 525/88 |
| 6,262,157 B1 * | 7/2001 | Cogen | C08K 5/0025 428/500 |
| 6,277,925 B1 | 8/2001 | Biswas et al. | |

(Continued)

FOREIGN PATENT DOCUMENTS

| | | |
|---|---|---|
| EP | 1146083 | 10/2001 |
| EP | 1881508 | 1/2008 |

(Continued)

*Primary Examiner* — William H. Mayo, III

(57) ABSTRACT

A crosslinkable low density polyethylene blend composition, cured product made therefrom, methods of making and using same, and articles containing same.

10 Claims, 1 Drawing Sheet

(comparative)

(56) References Cited

U.S. PATENT DOCUMENTS

| | | |
|---|---|---|
| 6,479,590 B1 | 11/2002 | Ikeda et al. |
| 6,496,629 B2 | 12/2002 | Ma et al. |
| 6,610,401 B2 | 8/2003 | Castellani et al. |
| 6,714,707 B2 | 3/2004 | Rossi et al. |
| 6,824,870 B2 | 11/2004 | Castellani et al. |
| 6,908,673 B2 | 6/2005 | Castellani et al. |
| 7,709,740 B2 * | 5/2010 | Reyes ............... C08L 23/10 174/110 R |
| 8,487,185 B2 | 7/2013 | Machl et al. |
| 2009/0149614 A1 | 6/2009 | Loyens et al. |
| 2015/0122529 A1 * | 5/2015 | Han ............... H01B 3/441 174/110 PM |
| 2016/0152807 A1 * | 6/2016 | Chaudhary ......... C08L 23/0815 428/375 |
| 2018/0134882 A1 | 5/2018 | Chaudhary |

FOREIGN PATENT DOCUMENTS

| | | | |
|---|---|---|---|
| EP | 2072576 | 6/2009 | |
| WO | WO 2010/024602 A2 * | 4/2010 | ............ C08L 23/12 |
| WO | 2015009562 | 1/2015 | |
| WO | WO 2015/009562 A1 * | 1/2015 | ............ H01B 3/44 |
| WO | 2016200600 | 12/2016 | |

\* cited by examiner

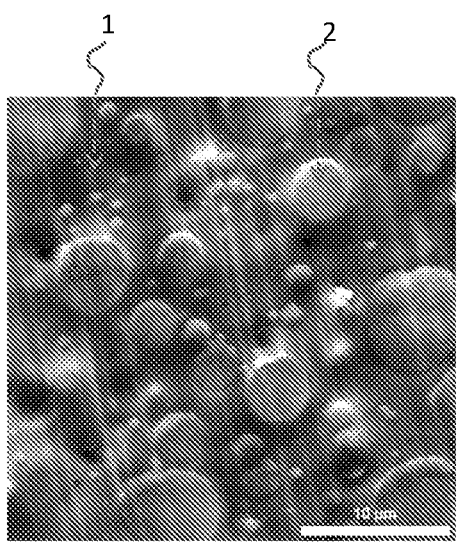
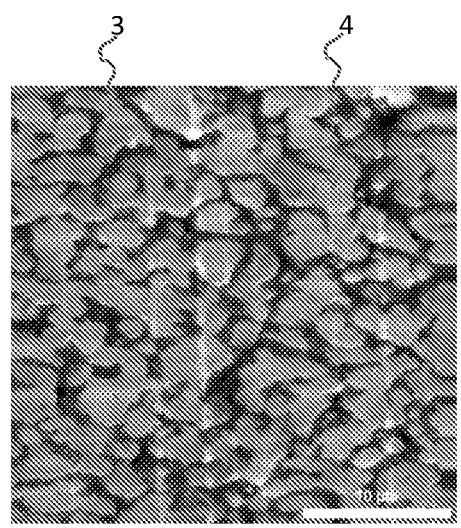
FIG. 1 (comparative)
FIG. 2

POLYOLEFIN BLEND WITH UNIQUE MICROPHASE STRUCTURE

FIELD

The field includes a polyolefin blend, a composition containing same, methods of making and using same, and articles containing same.

INTRODUCTION

Insulated electrical/optical conductors include insulated electrical conductors, insulated optical conductors, and insulated electro-optical conductors. Insulated optical conductors include coated optical fibers and optical fiber (fiber optic) cables for use in data-transmitting applications. Insulated electrical conductors include coated metal wires and electrical cables, including power cables for use in low voltage ("LV", >0 to <5 kilovolts (kV)), medium voltage ("MV", 5 to <69 kV), high voltage ("HV", 69 to 230 kV) and extra-high voltage ("EHV", >230 kV) electricity-transmitting/distributing applications. Insulated electro-optical conductors include coated optical fibers and coated metal wires for using in data- and/or electricity-transmitting applications. Power cable performance follows AEIC/ICEA standards and test methods.

As a power cable's operating voltage increases and/or it is exposed to moisture, risk of cable water-treeing and electrical-treeing increases. Industry typically uses an insulation layer that contains a dielectric additive such as a water-tree and/or electrical-tree retardant.

Cable coating compositions are known, including EP1881508A1, EP2072576A1, U.S. Pat. Nos. 5,212,218, 6,610,401B2, 6,824,870B2, and 6,908,673B2.

U.S. Pat. No. 6,824,870 B2 to L. Castellani, et al. (CASTELLANI) relates to a cable with recyclable covering, particularly for transporting or distributing medium or high voltage energy, in which at least one covering layer is based on thermoplastic polymer material comprising a polypropylene with ethylene or an α-olefin other than propylene in mixture with a dielectric liquid.

SUMMARY

We recognized a problem that hurts the manufacturing and performance of insulated electrical/optical conductors such as power cables. Typically MV, HV, and EHV cables rely on a dielectric additive in an insulative coating to inhibit water-treeing and electrical-treeing thereof. The additive complicates the manufacturing of the insulative coating with additional unit operations and/or process condition limitations. Also, the additive may leak from the insulative coating or, in multilayer coatings, contaminate other layers and hurt cable performance.

A technical solution to this problem was not obvious. Omitting the dielectric additive would have obvious drawbacks. A problem to be solved then is to formulate an insulation layer composition that is free of a dielectric liquid, alternatively a dielectric additive and yet enables satisfactory insulation layer performance.

Our technical solution to this problem includes a polyolefin blend of (A) a poly(alpha-olefin) (homo or co)polymer and (B) a poly(ethylene-co-(alpha-olefin)) copolymer (inventive blend). The inventive blend is characterized by a co-continuous pathways, microphase-separated network structure. It is believed that one of the beneficial functions of this structure is to inhibit water-treeing and electrical-treeing relative to a comparative additive-free compositions that do not have such a co-continuous pathways, microphase-separated structure. Thus, the inventive blend does not require a dielectric additive such as a water-tree and/or electrical-tree retardant. Also inventive are a method of making the inventive blend; a composition consisting essentially of the inventive blend and at least one additive (inventive composition), with the proviso that the co-continuous pathways, microphase-separated structure is maintained in the composition; a crosslinked polyolefin product (inventive product); a method of using the inventive blend, composition, or product; and manufactured articles comprising the inventive blend, composition, or product.

The inventive blend, composition, or product may be used to make a coating for wires and cables. The coating may be composed of a single layer, at least a portion of which is the inventive blend, composition, or product; or composed of multiple layers, at least one layer of which comprises the inventive blend, composition, or product. The article may be a coated wire or cable such as an insulated electrical/optical conductor containing the single or multilayer covering. The insulated electrical/optical conductor is useful for data- and/or electricity-transmitting/distributing applications, including low, medium, high, and ultra-high voltage applications. The inventive blend, composition, or product may be used for other unrelated methods and articles such as containers or vehicle parts.

DRAWINGS

FIG. 1 is a transmission electron microscope (TEM) photographic Image of the dispersed droplet microphase structure of a comparative polyolefin blend.

FIG. 2 is a TEM photographic Image of an example of the inventive polyolefin blend showing its co-continuous pathways, microphase network structure.

DETAILED DESCRIPTION

The Summary and Abstract are incorporated here by reference. Certain inventive embodiments are described below as numbered aspects for easy cross-referencing.

Embodiments of the inventive blend, composition, or product may be characterized by at least one, alternatively at least two, alternatively each of properties (i) to (iv): (i) decreased water-treeing; (ii) decreased electrical-treeing, (iii) increased electrical breakdown strength (in kilovolts per millimeter (kV/mm), and (iv) increased flexibility. Manufacturing the inventive blend, composition, or product may involve fewer unit operations than that for comparative materials that also contain a dielectric additive. Embodiments of the inventive blend, composition, or product may be free of a dielectric additive; such embodiments naturally do not experience additive leakage or migration.

The term "co-continuous pathways, microphase-separated network structure" means a bulk form of the inventive blend, composition, and product contains a first tortuous pathway of the (A) poly(alpha-olefin) (homo or co)polymer therein and a second tortuous pathway of the (B) poly (ethylene-co-(alpha-olefin)) copolymer therein, as determined according to Structure Test Method described later. Each tortuous pathway has independently an unbroken length of at least 30 micrometers (μm). The compositions of the (A) poly(alpha-olefin) (homo or co)polymer and the (B) molecular catalyst-derived poly(ethylene-co-(alpha-olefin))

copolymer are different from each other and independently may have morphological features on a scale from 1 nanometer (nm) to 1 μm.

A non-inventive blend of comparative polymers does not trace a tortuous pathway of at least 30 μm in an Image thereof. A co-continuous pathways, microphase-separated network structure is absent therein. E.g., one of the polymers may appear as a "sea" and the other polymer as "islands" in the sea.

Aspect 1. A polyolefin blend characterized according to Structure Test Method (described later) by a co-continuous pathways, microphase-separated network structure, which consists of a first phase of (A) a poly(alpha-olefin) (homo or co)polymer and a second phase of (B) a molecular catalyst-derived poly(ethylene-co-(alpha-olefin)) copolymer.

Aspect 2. The polyolefin blend of aspect 1, wherein: the (A) poly(alpha-olefin) (homo or co)polymer consists of from 95 to 100.0 weight percent alpha-olefin monomeric units, from 0 to 1 weight percent (wt %) ethylene comonomeric units, and from 0 to 5 wt % of trialkoxysilylalkyl groups, all based on total weight of (A); wherein each alpha-olefin monomeric unit is independently derived from the same or different ($C_3$-$C_{20}$)alpha-olefin; and the (B) molecular catalyst-derived ethylene/alpha-olefin copolymer consists of from 1 to 50 wt % ethylene monomeric units, from 99 to 50 wt % alpha-olefin comonomeric units, and from 0 to 5 wt % of trialkoxysilylalkyl groups, all based on total weight of (B).

Aspect 3. The polyolefin blend of aspect 1 or 2, characterized by any one of limitations (i) to (v): (i) the amount of the (A) poly(alpha-olefin) (homo or co)polymer in the polyolefin blend is from 5 to 95 weight percent (wt %) and the amount of the (B) molecular catalyst-derived ethylene/alpha-olefin copolymer in the polyolefin blend is from 95 to 5 wt %, all based on total weight of the polyolefin blend; or (ii) the amount of the (A) poly(alpha-olefin) (homo or co)polymer in the polyolefin blend is characterized by a first volume fraction, $V^1$, and the amount of the (B) molecular catalyst-derived ethylene/alpha-olefin copolymer in the polyolefin blend is characterized by a second volume fraction, $V^2$, wherein $V^1$ is from 0.05 to 0.95 and $V^2$ is from 0.95 to 0.05, all based on total volume fraction of the polyolefin blend of 1.00; or (iii) the (A) poly(alpha-olefin) (homo or co)polymer is characterized by a first melt viscosity, $\eta 1$, and the (B) molecular catalyst-derived ethylene/alpha-olefin copolymer is characterized by a second melt viscosity, $\eta 2$, wherein $\eta 1$ is from 100 to 50,000 Pascal-seconds (Pa·s) measured at 190° C. and $\eta 2$ is from 100 to 50,000 Pa·s measured at 190° C.; or (iv) both (ii) and (iii), wherein a multiplication product of a volume fraction ratio $V^2/V^1$ times a melt viscosity ratio $\eta 1/\eta 2$ is from 0.1 to 5.0; or (v) both (i) and (iv).

Aspect 4. The polyolefin blend of any one of aspects 1 to 3, characterized by any one of limitations (i) to (viii): (i) the (A) poly(alpha-olefin) (homo or co)polymer is a poly(($C_4$-$C_8$)alpha-olefin) copolymer (i.e., a copolymer) having monomeric units derived from at least two different ($C_4$-$C_8$) alpha-olefins; or (ii) the (A) poly(alpha-olefin) (homo or co)polymer is a poly(($C_4$-$C_8$)alpha-olefin) homopolymer having monomeric units derived from only one ($C_4$-$C_8$) alpha-olefin; or (iii) the (A) poly(alpha-olefin) (homo or co)polymer is a polypropylene homopolymer; or (iv) the (A) poly(alpha-olefin) (homo or co)polymer is an isotactic polypropylene homopolymer; or (v) the (B) molecular catalyst-derived ethylene/alpha-olefin copolymer is a molecular catalyst-derived ethylene/($C_3$-$C_8$)alpha-olefin copolymer; or (vi) the (B) molecular catalyst-derived ethylene/alpha-olefin copolymer is a molecular catalyst-derived ethylene/propylene copolymer; or (vii) the (B) molecular catalyst-derived ethylene/alpha-olefin copolymer is a molecular catalyst-derived ethylene/propylene copolymer that consists of 5 to 20 wt % ethylene monomeric units and from 95 to 80 wt % propylene comonomeric units; or (viii) a combination of any one of (i) to (iv) and any one of (v) to (vii).

Aspect 5. A method of making the polyolefin blend of any one of aspects 1 to 4, the method comprising melting a poly(alpha-olefin) (homo or co)polymer and a molecular catalyst-derived poly(ethylene-co-(alpha-olefin)) copolymer together to give a melt; blending the melt to give a melt blend; and allowing the melt blend to cool to give the polyolefin blend of a first phase of (A) and a second phase of (B), the polyolefin blend being characterized by the co-continuous pathways, microphase-separated network structure.

Aspect 6. A polyolefin composition comprising the polyolefin blend of any one of aspects 1 to 4, or the polyolefin blend made by the method of aspect 5, and at least one additive (constituent) (C) to (M): (C) an organic peroxide; (D) a propenyl-functional coagent; (E) an antioxidant; (F) an alkenyl-functional hydrolyzable silane; (G) an ultraviolet light-promoted degradation inhibitor ("UV stabilizer"); (H) a flame retardant; (I) a hindered amine stabilizer; (J) a tree retardant; (K) a colorant; (L) a liquid aromatic or saturated hydrocarbon (LASH); and (M) a scorch retardant; with the proviso that the total amount of the at least one additive is from >0 to 20 wt % of the polyolefin composition and the at least one additive does not destroy the co-continuous pathways, microphase-separated network structure of the polyolefin blend.

Aspect 7. A method of making the polyolefin composition of aspect 6, the method comprising contacting the polyolefin blend with the at least one additive (C) to (M) to give the polyolefin composition.

Aspect 8. A crosslinked polyolefin product that is a product of curing the polyolefin composition of aspect 6.

Aspect 9. A manufactured article comprising a shaped form of the polyolefin blend of any one of aspects 1 to 4, the polyolefin blend made by the method of aspect 5, the polyolefin composition of aspect 6, or the crosslinked polyolefin product of aspect 8.

Aspect 10. A coated conductor comprising a conductive core and an insulation layer at least partially covering the conductive core, wherein at least a portion of the insulation layer comprises the polyolefin blend of any one of aspects 1 to 4, the polyolefin blend made by the method of aspect 5, the polyolefin composition of aspect 6, or the crosslinked polyolefin product of aspect 8. The amount of the polyolefin blend in the insulation layer is a quantity that is effective for increasing the electrical breakdown strength of the insulation layer.

Aspect 11. A method of conducting electricity, the method comprising applying a voltage across the conductive core of the coated conductor of aspect 10 so as to generate a flow of electricity through the conductive core.

All properties described herein are measured according to their respective standard test methods described later unless explicitly indicated otherwise. Density is measured according to ASTM D792-13. Melt index ($I_2$) is measured according to ASTM D1238-04 (190° C., 2.16 kg).

Melt index ("MI"). An amount of a polyethylene at a specified temperature (e.g., 190° C.) that can be forced through an extrusion rheometer orifice of specified inner diameter (e.g., 2.0955 millimeters (0.0825 inch) for $MI_2$)

during a specified period of time (e.g., 10 minutes) when the polymer is subjected to a specified force (e.g., 2.16 kg for $MI_2$).

Melt viscosity ("η") (e.g., η1 and η2). Correlated with melt index, melt viscosity η=(1.94×10$^4$ Pascal)÷{(1838/ρ)× MI}, where p is the melt density at 190° C. in kilograms per cubic meter (kg/m$^3$). The melt density ρ is between 700 and 950 kg/m$^3$.

Polyolefin blend. The polyolefin blend is characterized according to the Structure Test Method by a co-continuous pathways, microphase-separated network structure, which consists of a first phase of (A) a poly(alpha-olefin) (homo or co)polymer and a second phase of (B) a molecular catalyst-derived poly(ethylene-co-(alpha-olefin)) copolymer. The polyolefin blend optionally may contain zero, one, or more additives (e.g., (C) to (M)) trapped within its co-continuous pathways, microphase-separated network structure, with the proviso that the one or more additives, or amounts thereof, do not destroy the co-continuous pathways, microphase-separated network structure. That is to say, the one or more additives, or amount(s) thereof, should not destroy the novel and basic characteristics of the polyolefin blend. Thus, in some aspects the polyolefin blend consists of (A) a poly (alpha-olefin) (homo or co)polymer and (B) a molecular catalyst-derived poly(ethylene-co-(alpha-olefin)) copolymer, wherein the polyolefin blend is characterized by a co-continuous pathways, microphase-separated network structure that consists of a first phase of (A) and a second phase of (B). In other aspects the polyolefin blend consists essentially of (A) a poly(alpha-olefin) (homo or co)polymer, (B) a molecular catalyst-derived poly(ethylene-co-(alpha-olefin)) copolymer, and one or more additives, wherein the polyolefin blend is characterized by a co-continuous pathways, microphase-separated network structure that consists of a first phase of (A) and a second phase of (B).

The (A) and (B) of the polyolefin blend are composed of macromolecules. The macromolecules of (A), (B), or both (A) and (B) independently may consist of carbon and hydrogen atoms. As such the macromolecules (A) and/or (B) independently may be free of other heteroatoms (e.g., halogen, N, O, S, Si, and P). Alternatively, the macromolecules of (A), (B), or both (A) and (B) independently may consist of carbon, hydrogen, silicon, and silicon-bonded oxygen and/or nitrogen atoms. As such the alternative (A) and (B) independently may be free of other heteroatoms (e.g., halogen, S, and P).

The polyolefin blend may be characterized by its chemical composition, chemical composition distribution (CCD), density, melt viscosity (η), melt index ($I_2$, 190° C., 2.16 kg), melting transition temperature(s), molecular weight distribution (MWD=$M_w/M_n$), number average molecular weight ($M_n$), weight average molecular weight ($M_w$), or a combination of any two or more thereof. The polyolefin blend may have a density from 0.850 to 0.950 gram per cubic centimeter (g/cm$^3$), alternatively from 0.850 to 0.900 g/cm$^3$. The polyolefin blend may have a melt index $I_2$ from 0.5 to 50 grams per 10 minutes (g/10 min.), alternatively from 0.5 to 20 g/10 min. The polyolefin blend may be characterized by its melt viscosity ratio η1/η2, volume fraction ratio $V^2/V^1$, or both, such as a multiplication product of $V^2/V^1$ times η1/η2=0.1 to 5.0, alternatively 0.2 to 4.5, alternatively 0.5 to 4.0. The polyolefin blend may be characterized by characteristics of (A), (B), or (A) and (B) prior to being blended. Prior to blending, each of (A) and (B) independently may be characterized by its chemical composition, CCD, density, melt viscosity (η), melt index ($I_2$, 190° C., 2.16 kg), melting transition temperature, MWD ($M_w/M_n$), $M_n$, $M_w$, or a combination of any two or more thereof.

Constituent (A): poly(alpha-olefin) (homo or co)polymer. (A) may be characterized by its monomer content (i.e., first alpha-olefin monomeric content) and, if any, comonomer content (i.e., second alpha-olefin monomeric content, if any). (A) may be a poly(alpha-olefin) homopolymer composed of propylene monomeric units, 1-butene monomeric units, 1-hexene monomeric units, or 1-octene monomeric units. Alternatively, (A) may be a poly(alpha-olefin) copolymer composed of propylene monomeric units and at least one of 1-butene monomeric units, 1-hexene monomeric units, and 1-octene monomeric units. (A) may have a density from 0.85 to 0.93 g/cm$^3$, alternatively from 0.87 to 0.92 g/cm$^3$, alternatively from 0.89 to 0.92 g/cm$^3$. (A) may have a melt index $I_2$ from 0.5 to 70 g/10 min., alternatively from 1 to 50 g/10 min., alternatively from 1 to 40 g/10 min. (A) may have a melting transition temperature from 50 degrees Celsius (° C.) to 175° C., alternatively from 80° to 175° C., alternatively from 155° to 174° C. (A) may have a melt viscosity, η1, from 100 to 50,000 Pa·s at 190° C., alternatively from 200 to 10,000 Pa·s at 190° C., alternatively from 300 to 5,000 Pa·s at 190° C. (A) may have $M_w$ from 10,000 to 500,000 grams per mole (g/mol), alternatively from 20,000 to 200,000 g/mol, alternatively from 30,000 to 100,000 g/mol.

Examples of (A) are commercially available and include polypropylene from Braskem S.A., São Paolo, Brasil.

Constituent (B): molecular catalyst-derived ethylene/alpha-olefin copolymer. (B) may be characterized by the molecular catalyst used to make it. The molecular catalyst may be a metallocene, alternatively a zirconocene, alternatively a constrained geometry catalyst. (B) may be characterized by its monomer content (i.e., ethylene monomeric content) and comonomer content (i.e., alpha-olefin comonomeric content). The alpha-olefin comonomeric units of (B) may be propylene monomeric units, alternatively 1-butene monomeric units, alternatively 1-hexene monomeric units, alternatively 1-octene monomeric units. (B) may have a density from 0.850 to 0.910 g/cm$^3$, alternatively from 0.860 to 0.900 g/cm$^3$, alternatively from 0.870 to 0.900 g/cm$^3$. (B) may have a melt index $I_2$ from 0.1 to 70 g/10 min., alternatively from 0.5 to 50 g/10 min., alternatively from 1.0 to 40 g/10 min. (B) may have a melting transition temperature from 40° to 150° C., alternatively from 50° to 120° C., alternatively from 55° to 95° C., alternatively from 55° to 65° C. (B) may have a melt viscosity, η2, from 100 to 50,000 Pa·s at 190° C., alternatively from 200 to 10,000 Pa·s at 190° C., alternatively from 300 to 5,000 Pa·s at 190° C. (B) may have $M_w$ from 10,000 to 500,000 g/mol, alternatively from 20,000 to 20,000 g/mol, alternatively from 30,000 to 100,000 g/mol. (B) may have MWD ($M_w/M_n$) from >2.00 to 3.0, alternatively from 2.01 to 2.9 g/mol, alternatively from 2.1 to 2.5 g/mol.

Examples of (B) are commercially available and include ENGAGE™ family of polyolefin elastomers and VERSIFY™ brand polymers available from The Dow Chemical Company, Midland, Mich., USA. ENGAGE™ polymers are ethylene/1-butene or ethylene/1-octene copolymers that typically have the following properties: molecular weight distribution narrow to moderate; $MI_2$ from <0.5 to 30 g/10 min. (190° C., 2.16 kg, ASTM D1238); density from 0.857 to 0.910 g/cm$^3$ (ASTM D792, Method B); glass transition temperature (Tg) from −61° to −35° C.; melting transition range from 36° to 103° C. (also referred to as DSC Melting Peak (rate 10° C./minute)); Shore A Hardness from 56 to 96 (ASTM D2240); and flexural modulus from 3 to 110 megapascals (MPa, ASTM D790). Examples of suitable ENGAGE™ ethylene/1-octene copolymers are ENGAGE™ 8003, 8100, 8107, 8130, 8137, 8150, 8157, 8180, 8187, 8200, 8207, 8400, 8401, 8402, 8407, 8411, 8440, 8450, 8452, 8480, 8540, and 8842. Examples of suitable ENGAGE™ ethylene/1-butene copolymers are ENGAGE™ 7256, 7270, 7277, 7367, 7447, 7457, and 7467. VERSIFY™ polymers are propylene/ethylene copolymers that typically have the following properties: molecular weight distribution narrow; melt flow rate (MFR) from 2 to 25 g/10 min. (230° C., 2.16 kg, ASTM D1238); density from 0.863 to 0.891 g/cm$^3$ (ASTM D792, Method B); glass transition temperature (Tg) from −15° to −35° C.; melting transition range from 50° to 120° C. (also referred to as DSC Melting Peak (rate 10° C./minute)); Shore A Hardness from 70 to 95 and higher (ASTM D2240); and flexural modulus from 25 to 400 MPa (ASTM D790). Examples of suitable VERSIFY™ propylene/ethylene copolymers are VERSIFY™ 2000, 2200, 2300, DE 2400.05, 3000, 3200, 3300, 3401, DE3402.00, 4200, and 4301. DSC means differential scanning calorimetry.

Polyolefin composition. The polyolefin composition comprises the polyolefin blend and the at least one additive (C) to (M): (C) organic peroxide; (D) propenyl-functional coagent; (E) antioxidant; (F) alkenyl-functional hydrolyzable silane; (G) ultraviolet light-promoted degradation inhibitor ("UV stabilizer"); (H) flame retardant; (I) hindered amine stabilizer; (J) tree retardant; (K) colorant; (L) liquid aromatic or saturated hydrocarbon (LASH); and (M) scorch retardant; with the proviso that the total amount of the at least one additive is from >0 to 20 wt % of the polyolefin composition and the at least one additive does not destroy the co-continuous pathways, microphase-separated network structure of the polyolefin blend. In some aspects the polyolefin composition comprises at least one of (C) organic peroxide (e.g., dicumyl peroxide), (D) propenyl-functional coagent (e.g., 2,4-diphenyl-4-methyl-1-pentene or 1,3-diisopropenylbenzene), (E) antioxidant (e.g., NAUGARD 445, VANOX MBPC, LOW INOX TBM-6, LOWINOX TBP-6, CYANOX 1790, IRGANOX 1010, IRGANOX 1035, or DSTDP), (F) alkenyl-functional hydrolyzable silane (vinyl trimethoxysilane, vinyl triacetoxysilane, or vinyl tris(methylethylketoxime)silane), (G) UV stabilizer (e.g., silica or carbon black), and (H) flame retardant (e.g., aluminum trihydrate). A suitable amount of each of the flame retardant, UV stabilizer, and crosslinker independently may be from >0 to 5 weight percent (wt %), alternatively 0.5 to 5 wt %, alternatively 1 to 2 wt %. A suitable amount of the antioxidant, organic peroxide, and cure coagent independently may be >0 to 3 wt %, alternatively 0.05 to 2.5 wt %, alternatively 0.1 to 2.0 wt %. A suitable total amount of all additives may be from >0 to 20 wt %, alternatively >0 to 15 wt %, alternatively 0.1 to 10 wt %, alternatively 0.5 to 7 wt %. The total weight of all constituents, including additives, in the polyolefin composition is 100.00 wt %.

The polyolefin composition may be configured to be free of an additive that promotes or enhances curing thereof. E.g., the polyolefin composition may be free of (C), (D), and (F).

Alternatively, the at least one additive of the polyolefin composition is peroxide curable and comprises the (C) organic peroxide, with or without the (D) coagent. The peroxide-curable polyolefin composition may be free of (F) alkenyl-functional hydrolyzable silane or hydrolyzable silylalkyl groups. Under curing conditions (typically comprising heating to a temperature above 160° C., alternatively above 180° C.) the (C) organic peroxide forms oxygen-radicals. The O-radicals abstract hydrogen atoms from interior carbon atoms in backbones or side chains of the (A) and (B), thereby generating internal polymeric chain free radicals on carbon atoms. The carbon radicals couple to form the crosslinked polyolefin product. The crosslinked polyolefin product comprises a networked polymer. The (D) may also react and form crosslinks in the crosslinked polyolefin product.

Alternatively, the at least one additive of the polyolefin composition is moisture curable and comprises the (F) alkenyl-functional hydrolyzable silane, and at least one of the constituents (A) and (B) contains hydrolyzable silyl groups bonded thereto. The moisture curable polyolefin composition may be free of (C) organic peroxide. Under curing conditions (typically in commercial scale manufacturing exposing the polyolefin composition to moisture of ambient air at ambient temperatures (e.g., 20° to 40° C.), Si—O—Si crosslinks are formed between different polymer chains of (A) and/or (B).

The polyolefin blend and polyolefin composition may be substantially free of, alternatively may not contain, a polyolefin other than constituents (A) and (B). E.g., may be substantially free from or, alternatively does not contain, an ethylene/unsaturated carboxylic ester copolymer, a polyorganosiloxane, a poly(alkylene glycol), or a polystyrene.

The polyolefin composition may be made by any suitable method provided that (A) and (B) are blended together to give the polyolefin blend. The (A) and (B) may be blended together as described herein before being contacted with an additive such as (C). That is, the polyolefin blend of (A) and (B) may be made, and then later contacted with any optional additive (C) to (M) or constituent. Alternatively, the (A) and (B) may be blended together as described herein in the presence of one or more optional additives (C) to (M), if any. Typically for (C), the polyolefin blend is made, and then the (C) organic peroxide is added to the polyolefin blend to give the polyolefin composition.

The polyolefin composition may be a one-part formulation, alternatively a two-part formulation, alternatively a three-part formulation. The one-part formulation comprises constituents (A) to (B), and at least one of additives (constituents) (C) to (M), in a single mixture, which is the polyolefin composition. The two-part formulation may comprise first and second parts, wherein the first part consists essentially of a blend of (A) and (B) and, optionally, (D) propenyl-functional coagent, and wherein the second part consists essentially of an additive masterbatch composition containing at least one of constituents (A) to (B), and any additives (C) to (M). The remaining additives (C) to (M), may be in the first part or the second part or both. The polyolefin composition may be made from the two-part formulation by combining the first and second parts to give an admixture thereof as the polyolefin composition. The three-part formulation may be the same as the two-part formulation except that constituent (C) is not in the first or second parts, but constituent (C) organic peroxide comprises a third part. When (C) comprises a third part, the polyolefin composition may be made by combining the first and second parts to give an admixture thereof containing constituents (A), (B), and at least one of (D) to (M); if desired optionally pelletizing the admixture to give the admixture in the form of pellets; and then contacting the admixture (e.g., pellets) with the third part (i.e., (C) organic peroxide to give the polyolefin composition. Generally, the combining or mixing (contacting) of constituents (A), (B), and any additives (C) to (M), may be carried out at a temperature from about 20° to 100° C. for 2 to 100 hours, e.g., 60° to 80° C. for 6 to 24 hours. Higher temperatures may be used when combining constituents (A), (B), and any additives (D) to (M), to give an admixture in the absence of (C) organic peroxide, and thereafter the admixture may be cooled to a temperature below a curing temperature before being combined or contacted with (C) organic peroxide. There generally aren't any formulation incompatibilities amongst (A) to (M).

The optional constituent (C): organic peroxide. The (C) organic peroxide may be 0.05 to 4.5 wt %, alternatively 0.1 to 3 wt %, alternatively 0.5 to 2.5 wt % of the polyolefin composition. The (C) organic peroxide may be of formula $R^O$—O—O—$R^O$, wherein each $R^O$ independently is a ($C_1$-$C_{20}$)alkyl group or ($C_6$-$C_{20}$)aryl group. Each ($C_1$-$C_{20}$)alkyl group independently is unsubstituted or substituted with 1 or 2 ($C_6$-$C_{12}$)aryl groups. Each ($C_6$-$C_{20}$)aryl group is unsubstituted or substituted with 1 to 4 ($C_1$-$C_{10}$)alkyl groups. The (C) organic peroxide may be any one of the organic peroxides described earlier, or a combination of any two or more thereof. In some aspects only a single type of (C) organic peroxide is used, e.g., a 20:80 (wt/wt) blend of t-butyl cumyl peroxide and bis(t-butyl peroxy isopropyl)benzene (e.g., LUPEROX D446B, which is commercially available from Arkema), alternatively dicumyl peroxide (e.g., PERKADOX BC-FF from AkzoNobel).

The optional constituent (D) propenyl-functional coagent. (D) is at least one propenyl-functional coagent. Also called a propenyl-functional crosslinker. The propenyl-functional coagent may have 1 or more, typically at most 6, propenyl groups on average per molecule. Each propenyl group is independently either a monovalent hydrocarbon functional group formally derived by abstracting any one hydrogen atom from propene ($H_2C$=C(H)$CH_3$) or a divalent hydrocarbon functional group (a "propen-diyl") formally derived by abstracting any two hydrogen atoms from propene. In some aspects each propenyl group is the monovalent. In other aspects at least one propenyl group is the divalent. In some aspects the propenyl-functional coagent is a ($H_2C$=C(H)($CH_2$)$_b$-functional) coagent. Also called ($H_2C$=C(H)($CH_2$)$_b$-functional) crosslinker. Subscript b is an integer of 0, 1, or 2; alternatively 0 or 1; alternatively 1 or 2; alternatively 0 or 3; alternatively 0; alternatively 1; alternatively 2. Examples of the ($H_2C$=C(H)($CH_2$)$_b$-functional groups are vinyl groups (b is 0), allyl groups (b is 1) and butenyl groups (b is 2). The (D) may have a molecule of molecular weight from 110 to 600 grams/mole (g/mol), alternatively 200 to 550 g/mol. In some aspects (D) is a hydrocarbon consisting of carbon and hydrogen atoms. In other aspects (D) is an oxahydrocarbon consisting of carbon and hydrogen atoms and 1 or more oxygen and/or nitrogen atoms. Examples of (D) having 1 ($H_2C$=C(H)($CH_2$)$_b$-functional group include the allyl compounds described in U.S. Pat. No. 6,277,925 B1, at column 2, line 61, to column 3, line 46, and at column 9, line 51 to column 10, line 29. Examples of the allyl compounds described in U.S. Pat. No. 6,277,925 B1 include 2-allylphenol; 2-allylphenyl allyl ether; 4-isopropenyl-2,6-dimethylphenyl allyl ether; 2,6-dimethyl-4-allylphenol; 2,6-dimethylphenyl allyl ether; 2,6-dimethyl-4-allylphenyl allyl ether; 2-methoxy-4-allylphenol; 2-methoxy-4-allylphenyl allyl ether; 2,2'-diallyl bisphenol A; O,O'-diallyl bisphenol A; and tetramethyl diallylbisphenol A; as well as mixtures of coagents described at column 10, lines 37-45. Other examples of (D) include 2,4-diphenyl-4-methyl-1-pentene, also known as alpha-methylstyrene dimer or "AMSD" (CAS No. 6362-80-7); and 1,3-diisopropenylbenzene ("DIPB", CAS No. 3748-13-8). The (D) may be a multi($H_2C$=C(H)($CH_2$)$_b$-functional) coagent having 2, 3, or 4 ($H_2C$=C(H)($CH_2$)$_b$— groups. Examples of the multi($H_2C$=C(H)($CH_2$)$_b$-functional) coagent include triallyl isocyanurate ("TAIC"); triallyl cyanurate ("TAC"); triallyl trimellitate ("TATM"; CAS No. 2694-54-4); N,N,N',N',N'',N''-hexaallyl-1,3,5-triazine-2,4,6-triamine ("HATATA"; also known as $N^2,N^2,N^4,N^4,N^6,N^6$-hexaallyl-1,3,5-triazine-2,4,6-triamine); triallyl orthoformate; pentaerythritol triallyl ether; triallyl citrate; and triallyl aconitate; acrylate-based coagents; multi-vinyl-based coagents; and other coagents such as those described in U.S. Pat. Nos. 5,346,961 and 4,018,852. Examples of suitable acrylate-based coagents are trimethylolpropane triacrylate ("TMPTA"); trimethylolpropane trimethyl acrylate ("TMPTMA"); ethoxylated bisphenol A dimethacrylate; 1,6-hexanediol diacrylate; pentaerythritol tetraacrylate; dipentaerythritol pentaacrylate; tris(2-hydroxyethyl) isocyanurate triacrylate; and propoxylated glyceryl triacrylate. Examples of suitable multi-vinyl-based coagents are polybutadiene having a high 1,2-divinyl content; and trivinyl cyclohexane ("TVCH"). In some aspects (D) is AMSD, TAC, TAIC, HATATA, or TMPTA; alternatively AMSD, TAC, or TAIC; alternatively AMSD. The (D) functions to increase crosslink density in the resulting cured polyolefin product relative to crosslink density that can be obtained in the absence of the (D).

The optional constituent (E) antioxidant. The (E) antioxidant functions to provide antioxidizing properties to the polyolefin composition and/or peroxide-cured semiconducting product. Examples of suitable (E) are bis(4-(1-methyl-1-phenylethyl)phenyl)amine (e.g., NAUGARD 445); 2,2'-methylene-bis(4-methyl-6-t-butylphenol) (e.g., VANOX MBPC); 2,2'-thiobis(2-t-butyl-5-methylphenol (CAS No. 90-66-4, commercially LOWINOX TBM-6); 2,2'-thiobis(6-t-butyl-4-methylphenol (CAS No. 90-66-4, commercially LOW INOX TBP-6); tris[(4-tert-butyl-3-hydroxy-2,6-dimethylphenyl)methyl]-1,3,5-triazine-2,4,6-trione (e.g., CYANOX 1790); pentaerythritol tetrakis(3-(3,5-bis(1,1-dimethylethyl)-4-hydroxyphenyl)propionate (e.g., IRGANOX 1010, CAS Number 6683-19-8); 3,5-bis(1,1-dimethylethyl)-4-hydroxybenzenepropanoic acid 2,2'-thiodiethanediyl ester (e.g., IRGANOX 1035, CAS Number 41484-35-9); and distearyl thiodipropionate ("DSTDP"). In some aspects (E) is bis(4-(1-methyl-1-phenylethyl)phenyl)amine (e.g., NAUGARD 445, which is commercially available from Addivant, Danbury, Conn., U.S.A.). (E) may be 0.01 to 1.5 wt %, alternatively 0.05 to 1.2 wt %, alternatively 0.1 to 1.0 wt % of the polyolefin composition.

Constituent (F) alkenyl-functional hydrolyzable silane. The (F) may be an alkenyl-functional trialkoxysilane, an alkenyl-functional tricarboxysilane, or an alkenyl-functional tris(dialkylketoxime)silane (i.e., alkenyl-functional tris(dialkylketoximo)silane. The alkenyl group may be vinyl, allyl, or butenyl; alternatively vinyl. The alkoxy groups may be methoxy, ethoxy, propoxy, butoxy, or a combination thereof. The carboxy groups may be acetoxy, propionyloxy, butyroxy. (F) may be vinyl trimethoxysilane, vinyl triacetoxysilane, or vinyl tris(methylethylketoxime)silane. The hydrolyzable silylakyl group may be derived from the (F). Thus, when alkenyl is vinyl, the hydrolyzable silylakyl group may be a trialkoxysilylethyl, tricarboxysilylethyl, or tris(dialkylketoxime)silyl. E.g., the hydrolyzable silylakyl group may be trimethoxysilylethyl, triacetoxysilylethyl, or tris(methylethylketoxime)silylethyl.

The optional constituent (G) UV stabilizer. (G) may be a particulate solid having an average particle size of 18 to 22 nanometers (nm). (G) may be carbon black or a hydrophobized fumed silica such as those commercially available under the CAB-O-SIL trade name from Cabot Corporation. The (G) UV stabilizer may also have flame retardant effects.

The optional constituent (H) flame retardant. (H) decreases flammability of the inventive composition or product. Examples of a flame retardant are organohalogen compounds, including brominated flame retardants, inorganic synergist compounds such as antimony trioxide, organophosphorous compounds, inorganic phosphorous compounds, metal hydrates such as alumina trihydrate, metal carbonates, and mixtures of any two or more thereof.

The optional constituent (I) hindered amine stabilizer. The (I) is a compound that has a sterically hindered amino functional group and inhibits oxidative degradation and can also reduce acid-catalyzed degradation, if any, of (C) organic peroxide. Examples of suitable (I) are butanedioic acid dimethyl ester, polymer with 4-hydroxy-2,2,6,6-tetramethyl-1-piperidine-ethanol (CAS No. 65447-77-0, commercially LOWILITE 62).

The optional constituent (J) water tree retardant or electrical tree retardant. The water tree retardant is a compound that inhibits water treeing, which is a process by which polyolefins degrade when exposed to the combined effects of an electric field and humidity or moisture. The electrical tree retardant is a compound that inhibits electrical treeing, which is an electrical pre-breakdown process in solid electrical insulation due to partial electrical discharges. Electrical treeing can occur in the absence of water. Water treeing and electrical treeing are problems for electrical cables that contain a coated conductor wherein the coating contains a polyolefin. The (J) may be a poly(ethylene glycol) (PEG). (J) may be absent from the polyolefin blend/composition.

The optional constituent (K) colorant. E.g., a pigment or dye. E.g., titanium dioxide.

The optional constituent (L) liquid aromatic or saturated hydrocarbon (LASH). The LASH may have a boiling point (101 kilopascals (kPa)) of from 30° to 300° C., alternatively 40° to 250° C., alternatively 50° to 200° C. Examples of suitable LASH are 2-methylbutane, pentane, hexane, heptane, toluene, xylene(s), and combinations of any two or more thereof.

The optional constituent (M) scorch retardant. Examples of a scorch retardant are allyl-containing compounds described in U.S. Pat. No. 6,277,925B1, column 2, line 62, to column 3, line 46.

Additives (E) and (G) to (K), and (M) are additives that may be used to impart to either to the composition and/or to the product, one or more beneficial properties other than to crosslink density. Additives may be sprayed onto pellets of the inventive blend or composition to enhance extrusion thereof. The (L) LASH(s) is an additive that may be used to make, purge, or carry the peroxide-curable mer composition or crosslinked polyolefin product. Additives (C) to (M) are distinct compounds/materials from constituents (A) to (B) and from each other. Additives (C) to (K) and (M) typically are not removed from the crosslinked polyolefin product, although during curing such additives may form byproducts that are later removed. (L) LASH is chemically inert and may be volatile and removed.

The polyolefin composition may further comprise 0.005 to 0.5 wt % each of one or more optional additives selected from a carrier resin, a corrosion inhibitor (e.g., $SnSO_4$), lubricant, processing aid, anti-blocking agent, anti-static agent, nucleating agent, slip agent, plasticizer, tackifier, surfactant, extender oil, acid scavenger, voltage stabilizer, and metal deactivator.

To facilitate mixing of the blend of constituents (A) and (B) with the additive(s), the additive(s) may be provided in the form of an additive masterbatch, a dispersion of additive in a carrier resin. The carrier resin may be some of (A), some of (B), or some of the polyolefin blend of (A) and (B).

The crosslinked polyolefin product. The crosslinked polyolefin product contains networked polyolefinic resins that contain C—C bond crosslinks formed during curing of the polyolefin composition. The networked polyolefinic resins comprise products of coupling the crosslinkable (A) and (B) and optionally products of coupling same with (D) propenyl-functional coagent. Other approaches for making the crosslinked polyolefin product may also be utilized, including radiation crosslinking and, in embodiments wherein (A) and/or (B) contains a hydrolyzable silane groups as discussed earlier, moisture-induced crosslinking. The crosslinked polyolefin product may also contain by-products of curing such as alcohol products of the reaction of the (C) organic peroxide. When the polyolefin composition further contains one or more of any additives (C) to (M), the crosslinked polyolefin product may also contain the any one or more of the additives (E) to (N), or one or more reaction byproducts formed therefrom during the curing of the polyolefin composition. Any (L) LASH(s) and any other volatile compounds (e.g., unreacted comonomer) may be removed from the crosslinked polyolefin product to give a crosslinked polyolefin product that is substantially free of LASH and any other volatile byproduct compounds. Such removal may be performed by any suitable means such as decantation, devolatilization, distillation, evaporation, filtration, sparging with inert gas (e.g., anhydrous $N_2$ gas), and stripping. The crosslinked polyolefin product may be in a divided solid form or in continuous form. The divided solid form may comprise granules, pellets, powder, or a combination of any two or more thereof. The continuous form may be a molded part (e.g., blow molded part) or an extruded part (e.g., a coated conductor or a cable).

The coated conductor. The coated conductor may be an insulated electrical/optical conductor, which may be an insulated electrical conductor, insulated optical conductor, or insulated electro-optical conductor. The insulated optical conductor may include coated optical fibers and/or optical fiber (fiber optic) cables for use in data-transmitting applications. The insulated electrical conductor may include coated metal wires and/or electrical cables, including power cables, for use in low, medium, high and extra-high voltage electricity-transmitting applications. The insulated electro-optical conductor may include a coated combination of optical fibers and metal wires for using in both data-transmitting and electricity-transmitting applications. A "wire" means a single strand or filament of conductive material, e.g., conductive metal such as copper or aluminum, or a single strand or filament of optical fiber. A "cable" and "power cable" are synonymous and mean an insulated conductor comprising at least one wire or optical fiber, or a combination thereof, disposed within a covering that may be referred to as a sheath, jacket (protective outer jacket), or coating. When the insulated conductor contains a wire, it may be called an insulated electrical conductor; when it contains an optical fiber, it may be called an insulated optical conductor. The insulated electrical conductor may be designed and constructed for use in medium, high, or extra-high voltage applications. Examples of suitable cable designs are shown in U.S. Pat. Nos. 5,246,783; 6,496,629; and 6,714,707.

The insulated electrical/optical conductor may contain a conductor core and an outer single layer covering or an outer multilayer covering disposed therearound so as to protect and insulate the conductor core from external environments. The conductor core may be composed of one or more metal wires, one or more optical fibers, or a combination thereof. When the conductor core contains two or more metal wires and/or optical fibers, the metal wires may be sub-divided into discrete wire bundles and the optical fibers may be sub-divided into discrete fiber bundles. Each wire or optical fiber in the conductor core, whether bundled or not, may be individually coated with an insulation layer and/or the discrete bundles may be coated with an insulation layer. The single layer covering or multilayer covering (e.g., a single layer or multilayer coating or sheath) primarily functions to protect or insulate the conductor core from external environments such as sunlight, water, heat, oxygen, other conductive materials (e.g., to prevent short-circuiting), and/or other corrosive materials (e.g., chemical fumes).

The single layer or multilayer covering from one insulated electrical/optical conductor to the next may be configured differently depending upon their respective intended uses. For example, viewed in cross-section, the multilayer covering of the insulated electrical conductor may be configured sequentially from its innermost layer to its outermost layer with the following components: an inner semiconducting layer, a crosslinked polyolefin insulation layer comprising the crosslinked polyolefin product (inventive crosslinked product), an outer semiconducting layer, a metal shield, and a protective sheath. The layers and sheath are circumferentially and coaxially (longitudinally) continuous. The metal shield (ground) is coaxially continuous, and circumferentially either continuous (a layer) or discontinuous (tape or wire). Depending on the intended application the multilayer covering for the insulated optical conductor may omit the semiconducting layers and/or the metal shield, but may include a light-blocking material to prevent cross-talk between optical fibers and/or a stiffening material such as polymer fibers or bundles thereof to prevent overbending leading to breaking of the optical fibers. The outer semiconducting layer, when present, may be composed of a peroxide-crosslinked semiconducting product that is strippable from the crosslinked polyolefin layer.

The method of conducting electricity. The inventive method of conducting electricity may use the inventive coated conductor that comprises the insulated electrical conductor embodiment or the insulated electro-optical conductor embodiment.

Advantageously we discovered that the polyolefin blend and polyolefin composition have improved (increased) wet electrical aging performance (increased electrical breakdown strength) compared to polypropylene homopolymer or a polypropylene composition, respectively. Alternatively or additionally, the polyolefin blend and polyolefin composition have improved (increased) wet electrical aging performance (increased electrical breakdown strength) compared to a comparative blend and composition (see Comparative Example 1 below) that is characterized as an islands-in-the-sea (droplet dispersion) structure as discussed earlier. The present co-continuous pathways, microphase-separated network structure is believed to enable the improved performance of the inventive polyolefin blend and composition. The inventive insulated electrical/optical conductor is useful for data-transmitting applications and/or for electricity-transmitting applications, including low, medium, high, and ultra-high voltage applications.

The inventive blend, composition, and product are useful in a variety of applications including in containers, vehicle parts, and as a component of a coating of the coated conductor (e.g., the insulated electrical conductor) such as a coated wire or coated cable for use in the electrical or telecommunications industry, including medium voltage, high voltage, and extra-high voltage electrical cables. E.g., medium voltage electrical cables.

Olefin polymerization catalysts include Ziegler-Natta catalysts, Chrome catalysts, and molecular catalysts. Ziegler-Natta (Z-N) such as $TiCl_4/MgCl_2$ and Chrome catalysts such as a chromium oxide/silica gel are heterogeneous in that their catalytic sites are not derived from a single molecular species. Heterogeneous catalysts produce polyolefins with broad molecular weight distributions (MWD) and broad chemical composition distributions (CCD). A molecular catalyst is homogeneous in that it theoretically has a single catalytic site that is derived from a ligand-metal complex molecule with defined ligands and structure. As a result, molecular catalysts produce polyolefins with narrow CCD and narrow MWD, approaching but in practice not reaching the theoretical limit of Mw/Mn=2. Metallocenes are molecular catalysts that contain unsubstituted cyclopentadienyl ligands (Cp). Post-metallocene are derivatives of metallocenes that contain one or more substituted CP ligands, such as constrained geometry catalysts, or are non-sandwich complexes. Examples of post-metallocene catalysts are bis-phenylphenoxy catalysts, constrained geometry catalysts, imino-amido type catalysts, pyridylamide catalysts, imino-enamido catalysts, aminotroponiminato catalysts, amidoquinoline catalysts, bis(phenoxyimine) catalysts, and phosphinimide catalysts.

A compound includes all its isotopes and natural abundance and isotopically-enriched forms. The enriched forms may have medical or anti-counterfeiting uses.

In some aspects any compound, composition, formulation, mixture, or reaction product herein may be free of any one of the chemical elements selected from the group consisting of: H, Li, Be, B, C, N, O, F, Na, Mg, Al, Si, P, S, Cl, K, Ca, Sc, Ti, V, Cr, Mn, Fe, Co, Ni, Cu, Zn, Ga, Ge, As, Se, Br, Rb, Sr, Y, Zr, Nb, Mo, Tc, Ru, Rh, Pd, Ag, Cd, In, Sn, Sb, Te, I, Cs, Ba, Hf, Ta, W, Re, Os, Ir, Pt, Au, Hg, Tl, Pb, Bi, lanthanoids, and actinoids; with the proviso that chemical elements required by the compound, composition, formulation, mixture, or reaction product (e.g., C and H required by a polyolefin or C, H, and O required by an alcohol) are not counted.

The following apply unless indicated otherwise. Alternatively precedes a distinct embodiment. AEIC means Association of Edison Illuminating Companies, Birmingham, Ala., USA. ASTM means the standards organization, ASTM International, West Conshohocken, Pa., USA. IEC means the standards organization, International Electrotechnical Commission, Geneva, Switzerland. ISO means the standards organization, International Organization for Standardization, Geneva, Switzerland. Any comparative example is used for illustration purposes only and shall not be prior art. Free of or lacks means a complete absence of; alternatively not detectable. ICEA means Insulated Cable Engineers Association and standards promulgated by IHS Markit, London, England. IUPAC is International Union of Pure and Applied Chemistry (IUPAC Secretariat, Research Triangle Park, N.C., USA). May confers a permitted choice, not an imperative. Operative means functionally capable or effective. Optional(ly) means is absent (or excluded), alternatively is present (or included). PPM are weight based. Properties are measured using a standard test method and conditions for the measuring (e.g., viscosity: 23° C. and 101.3 kPa). Ranges include endpoints, subranges, and whole and/or fractional values subsumed therein, except a range of integers does not include fractional values. Room temperature: 23° C.±1° C. Substantially free of a specific material means 0 to 1 wt %, alternatively 0 to <0.1 wt %, alternatively 0 wt % of the material. Substituted when referring to a compound means having, in place of hydrogen, one or more substituents, up to and including per substitution.

Unless noted otherwise herein, use the following preparations for characterizations.

Accelerated Wet Electrical Aging Test Method. To a 40 mils (1.016 mm) thick plaque of test material prepared according to the Compression Molded Plaque Preparation Method (below) applied a 6 kV electrical stress, 1 kiloHertz (kHz), while the plaque is immersed in a 0.01 molar aqueous sodium chloride solution for 21 days at 25° C. The result is an "Aged Plaque".

Blend Preparation Method 1. constituents (A) and (B) were melt blended in a Brabender internal mixer at 190° C. for 15 minutes at 30 rotations per minute (rpm) to obtain an embodiment of the polyolefin blend as a uniform dispersion. For laboratory scale procedures, use batch mixers and single screw extruders for melt blending and pelletizing. Soak peroxide into the pellets containing blended additives at 60° to 80° C. for 6 to 24 hours.

Compression Molded Plaque Preparation Method: The polyolefin blend obtained from Blend Preparation Method 1 above was then compression molded at 185° C. and 2,000 pounds per square inch (psi, 13.8 megapascals (MPa)) for 5 minutes, followed by 25 tons (345 MPa) for 25 minutes. The resulting compression molded plaque was quenched to room temperature under 25 tons (345 MPa) for 10 minutes, thereby giving a compression molded plaque.

Density Test Method: measured according to ASTM D792-13, *Standard Test Methods for Density and Specific Gravity (Relative Density) of Plastics by Displacement*, Method B (for testing solid plastics in liquids other than water, e.g., in liquid 2-propanol). Report results in units of grams per cubic centimeter (g/cm$^3$).

Electrical Breakdown Strength Test Method. Performed test method on both unaged 40 mil (1.016 mm) thick plaque of test material prepared according to the Compression Molded Plaque Preparation Method and on the Aged Plaque obtained according to the Accelerated Wet Electrical Aging Test Method. Used an alternating current (AC) breakdown tester and system controller. Immersed the Unaged or Aged Plaque in oil and held between electrodes in a cylindrical disk shaped electrode system. Applied a voltage, which started at 0 volts and was increased at a rate of 500 volts per second until internal breakdown of the Unaged or Aged Plaque occurred. Breakdown was characterized as a sudden increase in electrical current in the test circuit that may activate a sensing element such as a circuit breaker, fuse, and/or current-sensing circuit. Run is typically repeated 5 times and an average value is obtained. The average result is expressed in kV/mm. The higher the kV/mm value, beneficially the greater the voltage applied per millimeter thickness of the Aged Plaque when electrical breakdown was observed, and thus beneficially the greater the electrical breakdown strength of the test material. In some aspects the polyolefin blend is characterized by an electrical breakdown strength before wet electrical aging of from 40 to 50 kV/mm, alternatively 40 to 45 kV/mm. In some aspects the polyolefin blend is characterized by an electrical breakdown strength after wet electrical aging of from 30.0 to 40 kV/mm, alternatively 30.1 to 35 kV/mm. Alternatively or additionally, the lesser the percentage decrease in electrical breakdown strength from Unaged Plaque to Aged Plaque, beneficially the greater the electrical breakdown strength. In some aspects the polyolefin blend is characterized by a mean decrease in electrical breakdown strength from Unaged Plaque to Aged Plaque (from before to after wet electrical aging) of 19 to 23%, alternatively 20.1% to 22.0%.

Image Preparation Method. The Image used for assessing co-continuous pathways, microphase-separated network structure according to Structure Test Method may be obtained by melting and blending the (A) poly(alpha-olefin) (homo or co)polymer and (B) molecular catalyst-derived poly(ethylene-co-(alpha-olefin)) copolymer to give a melt blend thereof; allowing the melt blend to cool and separate into different phases on a 1 nm to 1 µm scale to give a phase-separated blend; forming a block of the phase-separated blend; cryo-sectioning the block at −45° C. (to prevent smearing) to give five 30 µm-by-30 µm-sided cross-sections thereof; using transmission electron microscope (TEM) to determine which portions of the differentially stained cross-section is due to polymer (A) and which portions are due to polymer (B); and scanning each of the cross-sections with a scanning tip of a Bruker Dimension™ atomic force microscope in tapping mode to obtain raw cross-sectional images thereof. Each of the raw cross-sectional images are then post-processed using commercial imaging software (STIP Image Process software, version 5.1.11 from Image Metrology) to give the Images used for determining presence or absence of the co-continuous pathways, microphase-separated network structure according to Structure Test Method.

Melt index (190° C., 2.16 kilograms (kg), "$I_2$") Test Method: for ethylene-based (co)polymer is measured according to ASTM D1238-04, *Standard Test Method for Melt Flow Rates of Thermoplastics by Extrusion Platometer*, using conditions of 190° C./2.16 kilograms (kg), formerly known as "Condition E" and also known as $I_2$. Report results in units of grams eluted per 10 minutes (g/10 min.) or the equivalent in decigrams per 1.0 minute (dg/1 min.). 10.0 dg=1.00 g. Melt index is inversely proportional to the weight average molecular weight of the polyethylene, although the inverse proportionality is not linear. Thus, the higher the molecular weight, the lower the melt index.

Mechanical Loss Tangent Test Method. Performed dynamic mechanical analysis (DMA) using a DMA Q800 instrument from TA Instruments. Test samples were analyzed at a constant frequency of 1 Hertz (Hz) under constant thermal scanning rate of 5 C. per minute from room temperature to approximately 135° C. DMA measured mechanical loss tangent, modulus (stiffness), and damping (energy dissipation) properties and their dependence upon temperature as the test material was deformed under periodic stress. For comparison purposes, mechanical loss tangent value at 100° C. may be used. The lower the mechanical loss tangent at 100° C., beneficially the greater the thermal dimensional stability or resistance to mechanical vibration damping stress (a spring constant of 42 Newtons per meter (N/m)). In some aspects the polyolefin blend is characterized by a mechanical loss tangent at 100° C. from 0.10 to 0.40, alternatively 0.10 to 0.20, alternatively 0.11 to 0.15.

Structure Test Method: It is convenient to observe the co-continuous pathways, microphase-separated network structure experimentally using a 30 µm-by-30 µm-sided, processed cross-sectional image ("Image") of a bulk sample of the inventive blend prepared according to Image Preparation method described earlier. The co-continuous pathways, microphase-separated network structure is present in the Image as a first unbroken tortuous pathway of the (A) poly(alpha-olefin) (homo or co)polymer traced from a first edge portion of a first side of the Image across the Image to a first edge portion of the second side of the Image; and a second unbroken tortuous pathway of the (B) molecular catalyst-derived poly(ethylene-co-(alpha-olefin)) copolymer traced from a second edge portion of the first side of the Image across the Image to a second edge portion of the second side of the Image. The first and second edge portions of the first side of the Image are different from each other and the first and second edge portions of the second side of the Image are different from each other. The first and second unbroken tortuous pathways of the inventive blend do not intersect each other in the Image.

EXAMPLES

Constituent (A1): isotactic polypropylene homopolymer characterized by a density of 0.92 g/cm$^3$, a melt index ($I_2$) of 12.5 g/10 min., and a melting transition temperature from 160° to 170° C. Available as product from Braskem S.A.

Constituent (B1): a metallocene-derived propylene/ethylene copolymer containing 87 wt % propylene monomeric units and 13 wt % ethylene comonomeric units and having a density of 0.87 g/cm$^3$, a melt index ($I_2$) of 3.4 g/10 min. (190° C., 2.16 kilograms (kg)), and a melting transition temperature of 62° C. Available as product VERSIFY™ 3300 from The Dow Chemical Company.

Comparative Constituent (B2): a metallocene-derived ethylene/1-octene copolymer containing 70 wt % ethylene monomeric units and 30 wt % 1-octene comonomeric units and having a density of 0.87 g/cm$^3$, a melt index ($I_2$) of 4.9 g/10 min., and a melting transition temperature of 59° C. Available as product ENGAGE™ 8200 from The Dow Chemical Company.

Comparative Example 1 (CE1): 100 wt % (A1).

CE2: a blend of 30 wt % (A1) and 70 wt % (B2).

Inventive Example 1 (IE1): a polyolefin blend of 30 wt % (A1) and 70 wt % (B1).

CE2 and IE1 were imaged to assess their microphase structure according to the Structure Test Method described earlier. The structure assessments for CE2 and IE1 are shown in FIGS. 1 and 2, respectively. In FIG. 1 (comparative), a TEM photographic Image shows that propylene of (A1) forms a continuous microphase 1 and the metallocene-derived ethylene/1-octene copolymer (B2) forms droplets (discontinuous) microphase 2. Droplets 2 are dispersed as "islands" in a "sea" of microphase 1. In contrast in FIG. 2 (inventive), propylene of (A1) forms a first continuous pathway microphase 3, and the metallocene-derived propylene/ethylene copolymer (B1) forms a second continuous pathway microphase 4. Thus, the polyolefin blend of IE1 is characterized by a co-continuous pathways, microphase-separated network structure.

CE1, CE2, and IE1 were tested for electrical breakdown strength and mechanical loss tangent according to the relevant test methods described earlier. The compositions of CE1, CE2, and IE1 and test results are reported below in Table 1.

TABLE 1

Compositions and Test Results. ("0" means 0.00)

| Constituent (wt %) | CS1 | CS2 | IE1 |
| --- | --- | --- | --- |
| (A1) | 100 | 30 | 30 |
| (B1) | 0 | 0 | 70 |
| (B2) | 0 | 70 | 0 |
| Example Total | 100.00 | 100.00 | 100.00 |
| Microphase Structure Applicable | Not | Dispersed Droplets | Co-continuous pathways |
| Mean Electrical Breakdown-Unaged (kV/mm) | 48.6 | 38.7 | 43.2 |
| Mean Electrical Breakdown-Aged (kV/mm) | 32.2 | 29.3 | 34.0 |
| Mean Electrical Breakdown Decrease (kV/mm) | 16.4 | 9.4 | 9.2 |
| Mean Electrical Breakdown Decrease (%) | 33.7 | 24.3 | 21.3 |
| Mechanical Loss Tangent at 100° C. | Not tested | 0.8 | 0.13 |

As shown by respective FIGS. 1 and 2, CE2 has the dispersed droplets (discontinuous), microphase-separated structure shown in FIG. 1, whereas the IE1 has the co-continuous pathways, microphase-separated network structure shown in FIG. 2. As shown by the data in Table 1 and Table 1, the inventive polyolefin blend shows superior electrical breakdown strength both before wet electrical aging and after wet electrical aging relative to isotactic polypropylene homopolymer alone and relative to an ethylene rich polyolefin blend characterized by dispersed droplets microphase. The inventive polyolefin blend also shows superior mechanical loss tangent at 100° C. relative to an ethylene rich polyolefin blend characterized by dispersed droplets, microphase-separated structure.

Incorporate by reference here the below claims as numbered aspects except replace "claim" and "claims" by "aspect" or "aspects," respectively.

The invention claimed is:

1. A polyolefin blend characterized according to Structure Test Method by a co-continuous pathways, microphase-separated network structure, which consists of a first phase of (A) a poly(alpha-olefin) (homo or co)polymer and a second phase of (B) a molecular catalyst-derived poly (ethylene-co-(alpha-olefin)) copolymer; wherein the (A) poly(alpha-olefin) (homo or co)polymer is a polypropylene homopolymer and the (B) molecular catalyst-derived ethylene/alpha-olefin copolymer is a molecular catalyst-derived ethylene/propylene copolymer.

2. The polyolefin blend of claim 1, characterized by any one of limitations (i) to (v):
(i) the amount of the (A) poly(alpha-olefin) (homo or co)polymer in the polyolefin blend is from 5 to 95 weight percent (wt %) and the amount of the (B) molecular catalyst-derived ethylene/alpha-olefin copolymer in the polyolefin blend is from 95 to 5 wt %, all based on total weight of the polyolefin blend; or
(ii) the amount of the (A) poly(alpha-olefin) (homo or co)polymer in the polyolefin blend is characterized by a first volume fraction, $V^1$, and the amount of the (B) molecular catalyst-derived ethylene/alpha-olefin copolymer in the polyolefin blend is characterized by a second volume fraction, $V^2$, wherein $V^1$ is from 0.05 to 0.95 and $V^2$ is from 0.95 to 0.05, all based on total volume fraction of the polyolefin blend of 1.00; or
(iii) the (A) poly(alpha-olefin) (homo or co)polymer is characterized by a first melt viscosity, η1, and the (B) molecular catalyst-derived ethylene/alpha-olefin copolymer is characterized by a second melt viscosity, η2, wherein η1 is from 100 to 50,000 Pascal-seconds (Pa·s) measured at 190° C. and η2 is from 100 to 50,000 Pa·s measured at 190° C.; or (iv) both (ii) and (iii), wherein a multiplication product of a volume fraction ratio $V^2/V^1$ times a melt viscosity ratio $\eta1/\eta2$ is from 0.1 to 5.0; or (v) both (i) and (iv).

3. The polyolefin blend of claim 1, characterized by any one of limitations (i) to (iii):

(i) the (A) poly(alpha-olefin) (homo or co)polymer is an isotactic polypropylene homopolymer; or (ii) the (B) molecular catalyst-derived ethylene/alpha-olefin copolymer is a molecular catalyst-derived ethylene/propylene copolymer that consists of 5 to 20 wt % ethylene monomeric units and from 95 to 80 wt % propylene comonomeric units; or (iii) a combination of (i) and (ii).

4. A method of making the polyolefin blend of claim 1, the method comprising melting a poly(alpha-olefin) (homo or co)polymer and a molecular catalyst-derived poly(ethylene-co-(alpha-olefin)) copolymer together to give a melt; blending the melt to give a melt blend; and allowing the melt blend to cool to give the polyolefin blend of a first phase of (A) and a second phase of (B), the polyolefin blend being characterized by the co-continuous pathways, microphase-separated network structure; wherein the (A) poly(alpha-olefin) (homo or co)polymer is a polypropylene homopolymer and the (B) molecular catalyst-derived ethylene/alpha-olefin copolymer is a molecular catalyst-derived ethylene/propylene copolymer.

5. A polyolefin composition comprising the polyolefin blend of claim 1, or the polyolefin blend made by the method of claim 4, and at least one additive (C) to (M): (C) an organic peroxide; (D) a propenyl-functional coagent; (E) an antioxidant; (F) an alkenyl-functional hydrolyzable silane; (G) an ultraviolet light-promoted degradation inhibitor ("UV stabilizer"); (H) a flame retardant; (I) a hindered amine stabilizer; (J) a tree retardant; (K) a colorant; (L) a liquid aromatic or saturated hydrocarbon (LASH); and (M) a scorch retardant; with the proviso that the total amount of the at least one additive is from >0 to 20 wt % of the polyolefin composition and the at least one additive does not destroy the co-continuous pathways, microphase-separated network structure of the polyolefin blend.

6. A method of making the polyolefin composition of claim 5, the method comprising contacting the polyolefin blend with the at least one additive (C) to (M) to give the polyolefin composition.

7. A crosslinked polyolefin product that is a product of curing the polyolefin composition of claim 5.

8. A manufactured article comprising a shaped form of the polyolefin blend of claim 1.

9. A coated conductor comprising a conductive core and an insulation layer at least partially covering the conductive core, wherein at least a portion of the insulation layer comprises the crosslinked polyolefin product of claim 7.

10. A method of conducting electricity, the method comprising applying a voltage across the conductive core of the coated conductor of claim 9 so as to generate a flow of electricity through the conductive core.

* * * * *